Patented Apr. 24, 1923.

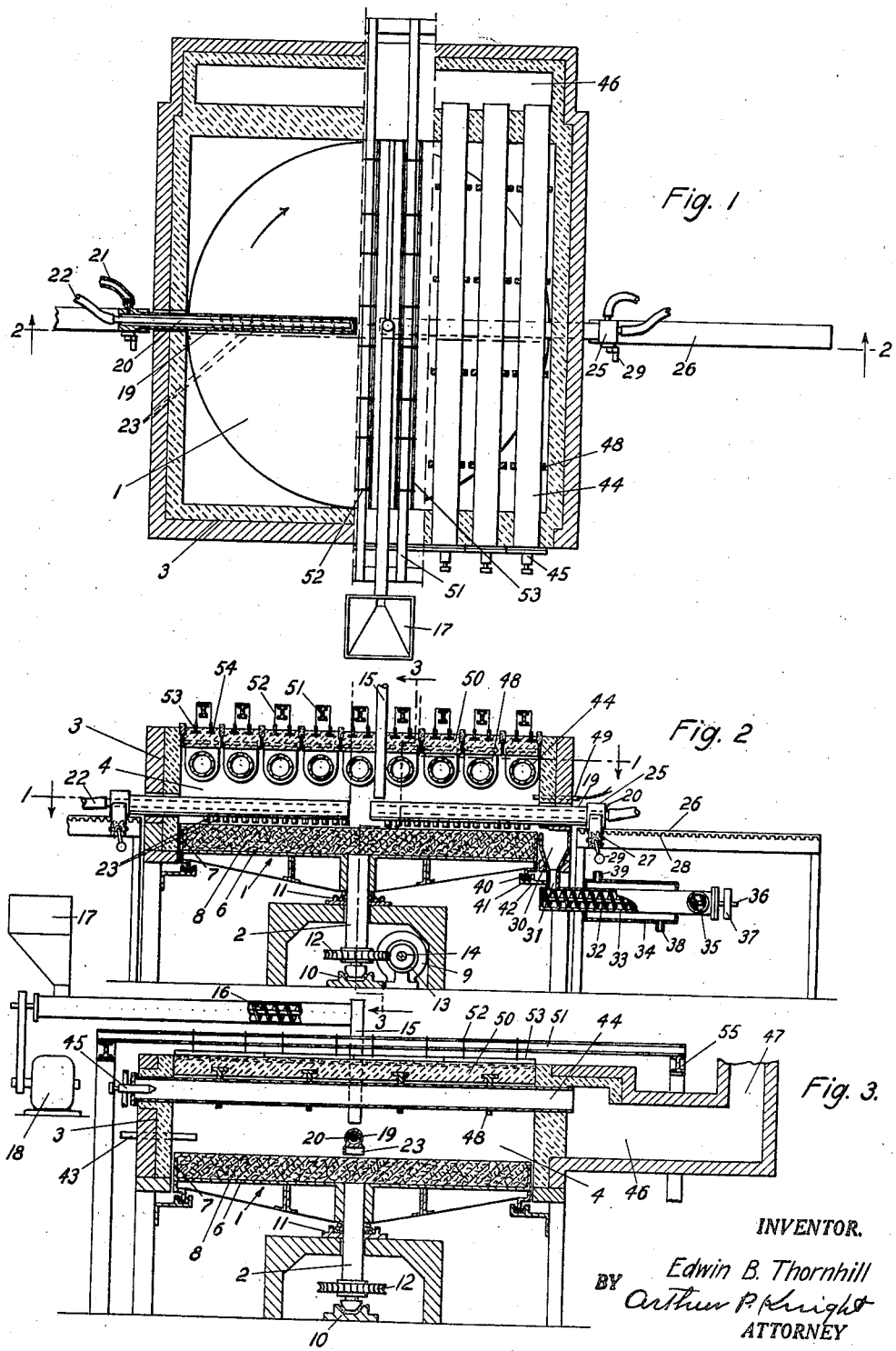

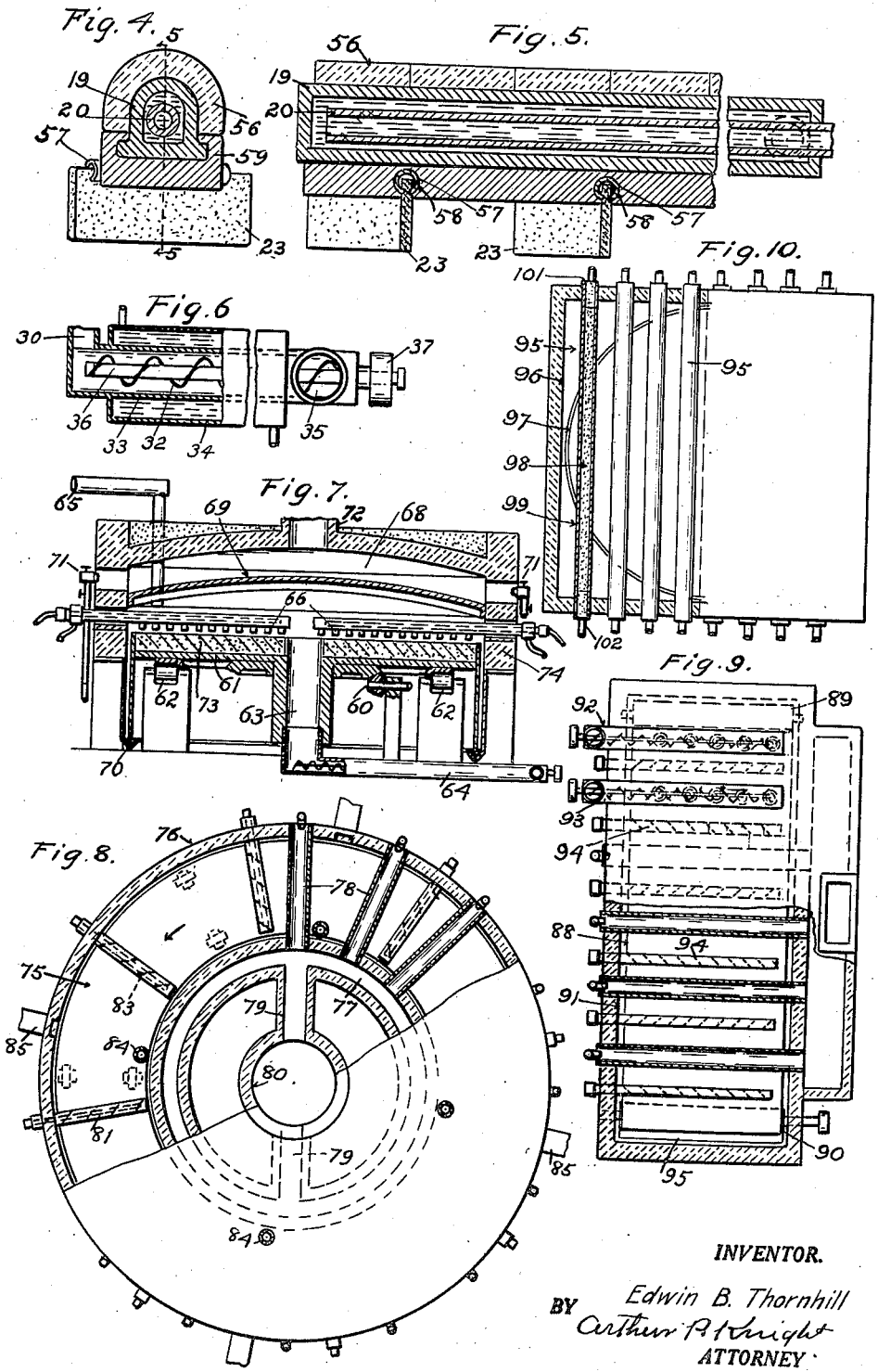

1,452,626

UNITED STATES PATENT OFFICE.

EDWIN B. THORNHILL, OF HURLEY, NEW MEXICO.

APPARATUS FOR THE PRODUCTION OF SPONGE IRON AND OTHER METALLIC PRODUCTS.

Application filed January 21, 1921. Serial No. 438,956.

*To all whom it may concern:*

Be it known that I, EDWIN B. THORNHILL, a citizen of the United States, residing at Hurley, in the county of Grant and State of New Mexico, have invented a new and useful Apparatus for the Production of Sponge Iron and Other Metallic Products, of which the following is a specification.

This invention relates to an apparatus for recovery of metals from ores, or calcines, and particularly for the production of sponge iron, which is metallic iron reduced from iron ore without fusion, the resulting product having the properties of friability and porosity resulting from its manner of production and being especially adapted for use in certain processes by reason of this physical structure, for example, as a precipitating agent in the hydrometallurgy of copper and other metals. The sponge iron produced by my process may be used, however, in the manufacture of iron and steel, as well as for other purposes. The apparatus hereinafter described may also be used for production of other metals from their ores, for example, zinc or tin.

The main object of the present invention is to provide a furnace for the production of sponge iron in an effective and economical manner and to overcome certain difficulties which have heretofore prevented such production on a commercial scale in the furnaces heretofore used for this purpose.

A further object of the invention is to provide for heating the ore without the use of heating blast directed in contact with the ore or into the ore reducing chamber, thereby ensuring reduction of the iron ore in a relatively quiescent reducing atmosphere and avoiding the liability either of the finely divided ore being carried off by the heating blast or of re-oxidation of the reduced iron by production of an oxidizing atmosphere in contact with the reduced iron.

Another object of the invention is to provide for carrying on the reduction of iron ore to sponge iron in a continuous process and to prevent interruption of the reducing operation in such a continuous process by reason of the ore or of the reduced iron agglomerating into masses or adhering to surfaces in contact therewith.

My invention may be embodied in various forms of apparatus, several forms of such apparatus being illustrated in the accompanying drawings, wherein—

Fig. 1 is a horizontal section on line 1—1 in Fig. 2 of a rotary hearth furnace adapted for carrying out the invention;

Fig. 2 is a vertical section thereof on line 2—2 in Fig. 1;

Fig. 3 is a vertical section on line 3—3 in Fig. 2;

Fig. 4 is a transverse section of a rabbling device used in the invention;

Fig. 5 is a section on line 5—5 in Fig 4;

Fig. 6 is a partly broken side elevation of means for removing the reduced product from the furnace;

Fig. 7 is a vertical section of another form of the invention; and

Figs. 8 to 10 are partly broken plan views of further modifications.

Referring to Figs. 1 to 3, the furnace therein shown comprises a rotary hearth 1 mounted to rotate on a vertical shaft 2 and a furnace casing or inclosure 3, which extends over and around said hearth to form a reducing chamber 4 above the hearth. Said furnace casing may be of any suitable form and may be constructed of any suitable material, for example, ordinary brick lined with firebrick.

The rotary hearth 1 may comprise a metallic floor member 6, circular in form, having peripheral flange 7, forming a pan in which is supported a bed 8 of suitable material which is non-adhering to the reduced metallic iron at the temperature of operation of the furnace. The material I prefer to use for this purpose is carbon in the form of crushed coke spread on the supporting member 6, the lower portion of this bed being preferably of relatively coarse coke, or similar material, and the top portion or surface layer thereof being of relatively finely divided coke, or similar material. The shaft 2 for the rotary hearth is journaled in a step bearing 10 at its lower end and is provided with an upper bearing 11 and is operated by any suitable means to effect a slow rotation of the hearth. For this purpose said shaft may carry a worm gear 12 operated by worm 13 on a shaft 14 driven by any suitable means, preferably a variable speed motor 9 to permit of control of the speed of rotation of the hearth.

A feed chute 15 extends downwardly through the roof of the furnace casing so as to discharge the ore, together with the reducing agent, onto the rotary hearth, preferably near the center thereof, the ore and reducing agent being fed to this chute by any suitable means, for example, by a screw feed device 16, feeding the material from a hopper or bin 17, and operated by a variable speed driving means 18.

Stationary rabbling devices are provided for moving, agitating and turning over the material on the rotary hearth. Two rabbling devices are shown herein, it being understood that any desired number may be used. Each of said rabbling devices comprises a tube or hollow arm 19 extending through the side wall of the furnace casing and having an inner tube 20 extending longitudinally therein to form passages communicating together at their inner ends and communicating, respectively, at their outer ends with inlet and outlet connections 21 and 22 for water or other cooling fluid. These tubes or arms 19 support the rabble blades 23, which consist of plates of suitable resistant material, preferably graphite, and are mounted on the supporting members 19 so as to extend obliquely to the direction of movement of the material on the adjacent portion of the rotary hearth; it being understood that these rabble blades extend from the supporting members 19 down to the top of the material-supporting bed 8 so as to penetrate or extend into and through the body of the ore and reducing agent supported on said bed and to continually stir the same as such body is carried around by the motion of the rotary hearth; the obliquity of these rabble blades also enabling them to act as pushers for forcing the material being treated radially outward on the rotary hearth and eventually discharging it from the outer edge of the hearth. The two rabbling devices described are shown as diametrically opposite and the rabbling plates plates thereon as arranged at intermediate radial distances in the case of the opposite device, so that the action of each rabble blade on one arm pushes the material outward in position for operation thereon by the corresponding rabble blade of the opposite arm, and the rabbling device being fixed, the material is finally pushed off of the hearth at a definite position adjacent to the rabbling device having the outermost rabbling blade and at this point of discharge a collecting hopper 30 is provided to receive the material so discharged and conduct it through a chute 31 to an outlet conveyor 32. Said outlet conveyor is shown as a screw conveyor mounted in a horizontal tube 33, which is provided with a water jacket 34, having inlet and outlet connections 38 and 39 for cooling the conveyor tube so as to reduce the temperature of the sponge sufficiently to prevent re-oxidation when it is finally discharged through outlet 35, near the outer end of tube 33. Conveyor 32 is carried by a horizontal shaft 36 operated by driving means 37 in any suitable manner. Rabble arms 19 are preferably mounted to slide through openings in the wall of the furnace to enable repair or removal thereof, each arm 19 being, for example, mounted on a carrier 25 sliding on a horizontal track 26 and operated inwardly or outwardly by a gear 27 in the carrier engaging with a rack 28 on said track, said gear 27 being manually operated by a crank 29.

To prevent access of external air through the joint between rotary hearth and the furnace casing, said hearth is preferably provided with a depending annular flange 40 running in an annular trough 41 on a floor member 42 extending from the side wall of the furnace casing, said trough being packed with finely divided solid heat resistant material, such as powdered coke, to form a seal for the joint. The rotary hearth is exposed to the outer air at its lower surface so that said hearth will always be at lower temperature than the reducing chamber. An inspection opening 43 may be provided in the side wall of the furnace casing, said opening also operating as a vent for escape of excess gas, but being sufficiently small to restrict the outflow of gas therethrough, so as to insure maintenance of a condition of pressure within the reducing chamber, in excess of atmospheric pressure. Saddles 56 of refractory material may be provided on top of rabble arms 19 to shield same from heat radiated from the heating means. The rabble blades 23 are shown as detachably mounted on the rabble arms, being secured in clips 57 which slide in grooves 58 in a hanger 59 mounted on the respective rabble arms.

Heating means 44 extend in the reducing chamber 4 and above rotary hearth 1 so as to heat the material on the hearth by radiation, said heating means being out of contact with the material being treated. Said heating means preferably consist of horizontal tubes of suitable resistant material extending through the side walls of the furnace, said tubes being open at one end for reception of burners 45 and opening at the other end into an outlet chamber 46 communicating wih a stack 47. Said heating tubes 44 may consist of any suitable refractory material, preferably material of good thermal conductivity, for example, carborundum, or similar material, and are supported from the roof of the furnace casing in any suitable manner, for example, by passing through openings in hangers 48 which may be of carborundum. The roof of the furnace is advantageously made in sections 50 corresponding to the said heating members 44, each section 50 being formed as a bar of refractory material, such as magnesite composition, or firebrick, interlocked with the supporting hangers 48 for the heating members which project downwardly therefrom, said section 50 being hung from supporting beams 51 by means of yokes 52 mounted on said beams and attached to bars 53 engaging in slots 54 in sections 50. Beams 51 are mounted at their ends on supports 55 independent of the furnace structure and are out of contact with the roof section 50, so as to prevent weakening of the beams by the heat of the furnace.

The operation of the above described apparatus is as follows:

Iron ore, which may consist of magnetite, or other oxidized ores of iron, or calcines produced by roasting sulfide ores of iron, is mixed with finely divided carbonaceous material, for example, crushed or powdered coal. It is desirable that the iron or calcine shall be in finely divided condition, say 30 mesh or finer, and the carbonaceous material should also be finely divided. It is also desirable that where coal is used as a carbonaceous reducing agent, it should be free of moisture and contain not more than a certain amount of volatile matter. If the coal contain more than such amount, say 20% of volatile matter, it is preferably subjected to a retorting operation to drive off the hydrocarbons distilling at low temperature, as well as any moisture present.

Where the expression iron ore is hereinafter used, it will be understood to cover iron-bearing calcines, or other artificial oxides produced from iron ores.

The iron ore, mixed with the carbonaceous reducing agent, is supplied from the hopper 17 by the feeding means 16 and 15, to the reducing chamber 4, being deposited on the rotary hearth near the center thereof in position to receive the action of the rabbling devices as the material is carried around by the motion of the rotary hearth 8. The rotary hearth being caused to revolve slowly by its driving mechanism, the mixture of iron ore and carbonaceous material carried by the hearth is moved around with the hearth against the rabbling blades 23 which, by reason of their obliquity or inclination, push or sweep the material toward the periphery of the hearth, at the same time stirring and turning over the material so as to prevent or break up any cohering action that may take place and to continually expose fresh surfaces to the heating action.

During this operation the heating devices 44 are brought to a high temperature by operation of the burners 45, the flames from which pass within and through the heating tubes 44 and heat the walls of such tubes so that they become incandescent; the heat being conducted through the walls and radiated from the outer surface thereof, part of the heat so radiated passing directly to the material distributed on the rotary hearth and part of such heat being radiated to the top and sides of the reducing chamber 4 and being radiated therefrom to the material on the hearth. By this means, the temperature of the reducing chamber is maintained at the point required for effective and economical reduction of the ore, for example, from 950° C. to 1000° C. It is essential that the temperature be controlled properly to ensure rapid reduction without fusion of the material, and for this purpose the speed of the hearth, the rate of feed, and the fuel supply to the burners are all regulated so as to maintain the requisite temperature, the temperature being observed by pyrometer means, indicated at 49. During this operation the reduction of the iron ore takes place and at the same time gases are produced maintaining the reducing atmosphere within the reducing chamber. Such reducing gases result partly from distillation of hydrocarbons from the coal or carbonaceous material, but an important element of the reducing gases is the carbon monoxide produced from the reaction of the carbonaceous material with the iron oxide or with carbon dioxide previously formed, the effect of the operation being to continually generate gases of a reducing nature, thereby maintaining a condition of pressure within the reducing chamber which effectively excludes leakage or admission of atmospheric air and products of combustion from the outside into the chamber. Any excess of reducing gas thus produced may pass off through the vent 43 being ignited, for example, at said vent, or such gases may be utilized, for example, by burning them in the combustion tubes 44. By the time the material reaches the discharge point at the periphery of the rotary hearth, it is substantially in reduced condition, the iron content thereof being in metallic condition, at least to the extent required in practice, and being in the form of a sponge and presenting an extreme degree of porosity and friability. The sponge thus produced, together with any excess of carbonaceous material discharged therewith, passes through the devices 30, 31 and 32 to the outlet 35, being cooled in transit so that when it is discharged it is sufficiently cool to prevent any re-oxidization of same. I have found that material so produced may be kept substantially free from oxidization for an indefinite period of time as long as it is maintained in substantially dry condition. The excess carbon present in the product discharged from the furnace may be removed from the sponge iron by any suitable separating means, for example, a magnetic separator, and this carbon may be returned to the furnace along with a fresh portion of the ore, any excess ash may be removed from time to time by screening or otherwise to prevent accumulation.

An important feature of the above described operation is that the heat, including that required for the reducing reaction, which is strongly endothermic, is maintained by radiating the heat onto and into the body of the material from the source or heating means within the reducing chamber, but above and out of contact with the material being reduced. This has the advantage that there is no possibility of the material coming in contact with the heating means and adhering thereto by reason of the high temperature thereof. This enables material, such as carborundum, to be used for the walls of the heating means, which would, at the temperature existing therein, tend to adhere to the ore or to the reduced iron under the conditions of operation of the furnace if brought in contact therewith. As almost all materials which have the requisite refractory properties for these heating elements are subject to this disability of tending to adhere to the material being treated when at the required temperature, the provision for maintaining the heating element out of contact with the material being treated contributes essentially to the continued operation of the furnace; moreover, the fact that the heating elements are out of contact with the material being treated relieves them from the wear or abrasion due to the motion of such material.

Another important feature of the above described operation is that the mixture of iron ore and carbonaceous material is supported during the entire operation on a bed of material which is non-adherent thereto, namely the bed 8 of carbon or divided coke, which has the property of permitting passage of the hot material, whether iron ore or reduced iron, in contact therewith, without tending to adhere thereto to any considerable extent under the temperatures maintained at the zone of contact. In this connection, the fact that the carbon of the hearth is in divided condition and is supported on a hearth which is exposed on its under face to contact with the outer air, tends to prevent the temperature of such zone of contact from becoming unduly high and to maintain the temperature of the bed below the temperature in the reducing chamber and below the temperature of the mixture of iron ore and reducing agent. Furthermore, any particles of carbon that may be brought up from the bed by the advancing body of ore and reducing agent and carried along therewith, do not interfere with the operation of the machine or with the quality of the product, the amount of such carbon being negligible and provision being made, if necessary, for separation of excess of carbon from the resulting product.

As an illustration of another form of apparatus in which my invention may be carried out, reference may be made to Fig. 7, which illustrates a furnace of the rotary hearth type in which a single combustion chamber is provided as a source of heat for radiation to the material on the hearth. In this figure the rotary hearth indicated at 61 is mounted to rotate in any suitable manner, for example, on roller bearings 62, having driving means 60, and has a central discharge passage 63 leading to an outlet conveyor 64. A feeding device 65 is provided for feeding the mixture of iron ore and reducing agent onto this hearth and stationary rabbles 66 are provided for stirring such material on the hearth and forcing it toward the outlet passage 63. A combustion chamber 68 is provided in the upper part of the furnace, the floor 69 of said chamber extending over the rotary hearth so as to radiate thereto and to the material thereon the heat conducted through such floor from the combustion chamber and said combustion chamber is provided with a burner means 71 for heating the same and with an outlet stack 72 for products of combustion. The floor 69 of the combustion chamber, forming the top of the reducing chamber, is preferably of material, such as carborundum, of requisite resistance to heat and conducting capacity. The operation of this form of furnace is substantially the same as above described, with the exception that the material being treated is in this case fed at the peripheral portion of the rotary hearth and discharged at the central portion thereof. The rotary hearth is shown in this case as provided with a carbon bed 73 (preferably granular) forming a non-adherent support for the ore. A water seal 70 is in this case provided for the joint between the rotary hearth 61 and the enclosing casing 74 of the furnace, said seal being sufficiently removed from the heated portion of the furnace to prevent undue evaporation.

The furnace casing may be annular in form, as shown at 75 in Fig. 8, being mounted to revolve on suitable bearings, the furnace chamber 76 also being annular and being provided with a gas outlet chamber 77 into which the several heating tubes 78 discharge the products of combustion, which are conducted from chamber 77 through flues 79 to a stack 80. Rabble arms 81 may, in this case, extend into the reducing chamber 76 from the outer walls thereof and are provided with blades 83 for stirring the material on the hearth and advancing it radially from feed outlets 84 to discharge outlet 85. The means for feeding and discharging the material and for revolving the hearth may be of any suitable construction.

As illustrated in Fig. 9, the hearth may be mounted for straight line operation, a conveyor 88 of the endless belt type being mounted on supporting and operating means 89—90 and adapted to support and convey the material in a reducing chamber 91. Said conveyor may comprise a belt of asbestos fabric, or other refractory material, on which the material is supported and I prefer to apply to said belt by distributing means 92 a protecting layer of finely divided carbon such as powdered coke, and to then apply the ore, and carbonaceous reducing material, on top of the protecting layer by feeding and distributing means 93, such mixture being rabbled by means 94 and carried over the end of the belt into suitable delivery means indicated at 95.

The radiation heating means for the furnace may be heated in any suitable manner, for example, by electrical operation, as illustrated in Fig. 10, a plurality of electric heating elements 95 being mounted, for example, in the top of the reducing chamber, indicated at 96, over the hearth 97. These electric heating elements may consist of divided carbon, indicated at 98, contained in carborundum tubes 99, and they may be provided with terminals 101 and 102 at the ends of the tubes for conducting current therethrough from any suitable source of electric current. Any other suitable form of electric heating units may be used.

It will be understood that the parts above referred to as being of carborundum may be of any material equivalent thereto, for example, compositions consisting of carborundum with a suitable binder.

The process which may be carried out in my improved apparatus, as above set forth, is not claimed herein as it forms the subject matter of another application of even date herewith.

While the above described apparatus is particularly adapted for the production of sponge iron, it may also be used for the production of other metals, for example, tin and zinc, from ores thereof, or it may be used for any other reducing operation requiring high temperature.

What I claim is:

1. An apparatus for reducing metals from ores, or other material, comprising a hearth provided with an ore supporting bed of material non-adherent to the heated ore, or reduced material, a reducing chamber extending over said bed, and heating means extending over said bed and adapted to heat the material thereon by radiation.

2. An apparatus, as set forth in claim 1, in which said heating means comprises combustion chamber means separated from the reducing chamber by heat conducting and radiating wall means.

3. An apparatus, as set forth in claim 2, in which said wall means consists of carborundum.

4. An apparatus, as set forth in claim 1, in which said hearth is exposed at its lower portion to the outer air, so as to be maintained at lower temperature than the reducing chamber.

5. An apparatus for reducing metals from ores, or other materials, comprising a hearth provided with a bed of carbon for supporting such materials, a reducing chamber extending over said hearth, and heating means extending over said hearth and adapted to heat the material on the hearth by radiation.

6. An apparatus, as set forth in claim 5, in which said ore supporting bed consists of carbon in divided condition.

7. An apparatus for reducing metals from ores, or other materials, consisting of a furnace comprising a hearth provided with a bed of material non-adherent to the heated ore, or reduced product, said furnace having a reducing chamber extending over said hearth, means for feeding ore, or other materials, to said bed, rabbling means for stirring and moving said ore over said bed, means for withdrawing the reduced product from the furnace, and radiating heating means extending over the hearth to heat the material thereon by radiation.

8. An apparatus for reducing metals from their ores, or other materials, consisting of a furnace having a reducing chamber, a rotary hearth having an ore supporting bed within said chamber, said bed being of material non-adherent to the heated ore, or reduced product, means for feeding material to said bed, stationary rabbling means for stirring the material on said bed and for causing the material to travel over said bed, means for withdrawing the reduced product from the furnace, and radiating heating means extending over the said hearth to radiate heat to the material thereon.

9. An apparatus, as set forth in claim 8, in which said heating means consists of tubes of refractory material extending within the reducing chamber with means for generating heat in the interior thereof.

10. An apparatus, as set forth in claim 8, in which said heating means comprises a plurality of similar heating units, independently and removably mounted over the hearth.

11. In an apparatus for reducing metals from their ores, or other materials, a reducing chamber, a hearth for supporting such materials within said reducing chamber, and rabbling means for stirring the material on said hearth, said rabbling means having rabbling blades consisting of carbon.

12. A reducing furnace comprising a reducing chamber provided with heating means, a hearth movably mounted below said heating means to support material to be reduced in position to receive heat by radiation from said heating means, means for supplying the material to be treated to said hearth and means for rabbling the material on said hearth.

In testimony whereof I have hereunto subscribed my name this 20th day of December, 1920.

EDWIN B. THORNHILL.